(12) United States Patent
Claywell et al.

(10) Patent No.: US 9,995,256 B2
(45) Date of Patent: Jun. 12, 2018

(54) CHARGE-AIR COOLER WITH PLENUM PARTITION

(71) Applicant: GM GLOBAL TECHNOLOGY OPERATIONS LLC, Detroit, MI (US)

(72) Inventors: Mark R. Claywell, Birmingham, MI (US); Maqsood Rizwan Ali Khan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 14/987,270

(22) Filed: Jan. 4, 2016

(65) Prior Publication Data

US 2017/0191453 A1    Jul. 6, 2017

(51) Int. Cl.
| | |
|---|---|
| *F02B 33/00* | (2006.01) |
| *F02M 15/00* | (2006.01) |
| *F02M 35/104* | (2006.01) |
| *F02B 29/04* | (2006.01) |
| *F02M 35/10* | (2006.01) |

(52) U.S. Cl.
CPC ..... *F02M 35/1045* (2013.01); *F02B 29/0437* (2013.01); *F02B 33/00* (2013.01); *F02B 29/04* (2013.01); *F02M 35/10354* (2013.01); *Y02T 10/146* (2013.01)

(58) Field of Classification Search
CPC .......... F02M 35/1045; F02M 35/10354; F02B 29/0437; F02B 33/00; F02B 29/04
USPC ......................................... 123/542, 540, 563
See application file for complete search history.

(56) References Cited

U.S. PATENT DOCUMENTS

| | | | |
|---|---|---|---|
| 2012/0167860 A1* | 7/2012 | Wong .................. | F02B 29/0462 123/542 |
| 2013/0133630 A1* | 5/2013 | Watanabe ........ | F02M 35/10262 123/527 |
| 2014/0290629 A1* | 10/2014 | Claywell ............ | F02M 35/1045 123/542 |

\* cited by examiner

*Primary Examiner* — Syed O Hasan
(74) *Attorney, Agent, or Firm* — Quinn IP Law

(57) ABSTRACT

An engine includes a cylinder block defining a bank of cylinders having physically adjacent first and second cylinders. The engine also has a gas compressor configured to pressurize an ambient airflow for delivery to the first cylinder and the second cylinder. The engine additionally has intake valves configured to control delivery of the pressurized airflow as a first airstream to the first cylinder and a second airstream to the second cylinder for combustion therein. A firing interval for the two adjacent cylinders results in the first airstream temporally overlapping the second airstream. A charge-air cooler is configured to cool the pressurized airflow prior to delivery thereof to the first and second cylinders and includes a cold-side plenum for discharging the pressurized airflow toward the first and second cylinders. A partition in the cold-side plenum is configured to separate the first airstream from the second airstream and thereby minimize interference therebetween.

16 Claims, 4 Drawing Sheets

CHARGE-AIR COOLER WITH PLENUM PARTITION

TECHNICAL FIELD

The present disclosure relates to a charge-air cooler having a plenum with a partition for use with a boosted internal combustion engine.

BACKGROUND

Internal combustion engines (ICE's) are often called upon to generate considerable levels of power for prolonged periods of time on a dependable basis. Many such engines employ forced induction via a gas compressor, such as a turbocharger or a supercharger, to pressurize ambient airflow for entry into combustion chambers of the ICE in order to boost the engine's power and efficiency.

Forced induction engines frequently employ charge-air coolers or heat exchangers to further enhance the engine's volumetric efficiency by increasing density of an intake air charge through nearly isobaric, i.e., constant pressure, cooling. Typically, such a charge-air cooler is situated between the compressor and the intake manifold in order to cool the pressurized air prior to its entry into the engine's combustion chambers.

SUMMARY

A charge-air cooler is provided for cooling pressurized air for a boosted internal combustion engine. The engine includes a cylinder block defining a bank of cylinders having a first cylinder and a physically adjacent second cylinder. The engine also has a cylinder head operatively connected to the cylinder block by being one of mounted to and integrally formed therewith and in fluid communication with the first cylinder and the second cylinder. The engine also has a gas compressor configured to selectively pressurize air received from the ambient for delivery to the first cylinder and the second cylinder. The engine additionally has a plurality of intake valves operatively connected to the cylinder head and configured to control delivery of the selectively pressurized air as a first airstream to the first cylinder and a second airstream to the second cylinder for combustion therein.

A firing interval for the adjacent first and second cylinders results in an occurrence of the first airstream temporally overlapping an occurrence of the second airstream. The engine also has a charge-air cooler arranged between the plurality of intake valves and the gas compressor and configured to cool the pressurized air prior to the delivery thereof to the first cylinder and the second cylinder. The charge-air cooler includes a cold-side plenum configured to discharge the pressurized air to the first cylinder and the second cylinder. A partition is arranged in the cold-side plenum and configured to separate the first airstream from the second airstream and thereby minimize interference therebetween.

The engine may additionally include a crankshaft configured to rotate relative to the cylinder block as a result of the combustion within the first and second cylinders. The firing interval for the adjacent first and second cylinders may be at 180×N degree intervals of crankshaft rotation, wherein N is an odd integer, resulting in the first and second airstreams cancelling each other out.

The partition can be configured to fully separate the first airstream from the second airstream and prevent communication and interference therebetween.

The partition can also be configured to partially separate the first airstream from the second airstream and permit a degree of communication or crosstalk therebetween.

The cold-side plenum may define a plenum volume, such that the partition divides the cold-side plenum into two sub-volumes.

A total count of cylinders defined by the bank of cylinders can be an even number. In such a case, the two sub-volumes can be equal.

A total count of cylinders defined by the bank of cylinders can be an odd number. In such a case, the two sub-volumes can be unequal.

The partition can be configured to increase velocity of the first and second airstreams through the charge-air cooler, such that energy of the respective first and second airstreams is used to enhance cooling of the pressurized airflow by the charge-air cooler.

The partition can be cast-in and/or machined into the cold-side plenum.

The charge-air cooler can be configured as an air-to-liquid intercooler.

The engine can additionally include an air inlet assembly configured to supply the pressurized air from the ambient to the gas compressor.

Another embodiment of the present disclosure is directed to a vehicle having such an internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
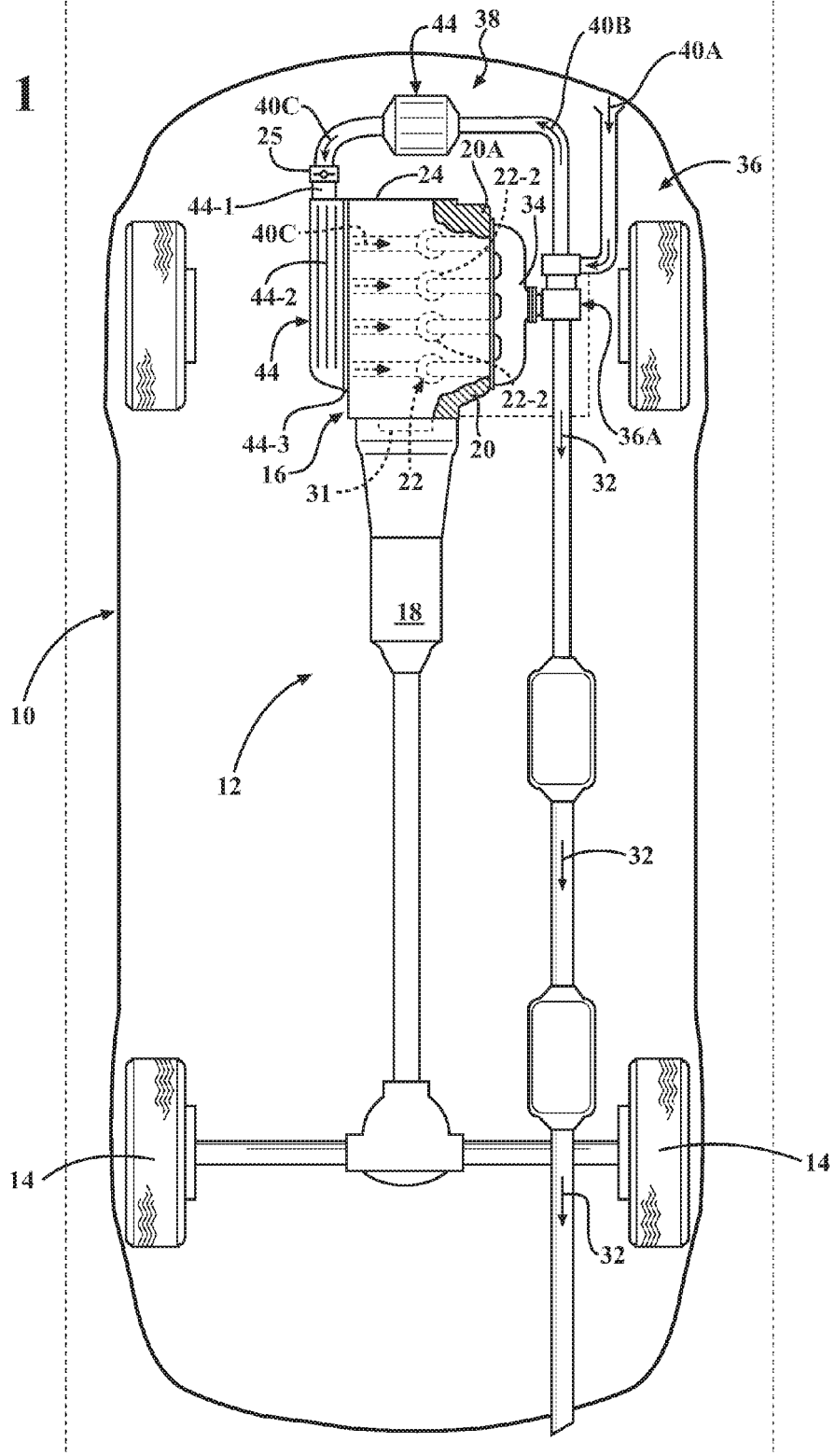
FIG. 1 is a schematic depiction of a vehicle having a representative engine with a single bank of cylinders and an induction system employing a gas compressor and a charge-air cooler according to the disclosure.

Referring to the drawings, wherein like reference numbers correspond to like or similar components throughout the several figures, FIG. 1 illustrates a vehicle 10 employing a powertrain 12 for propulsion thereof via driven wheels 14.

Figure 2:
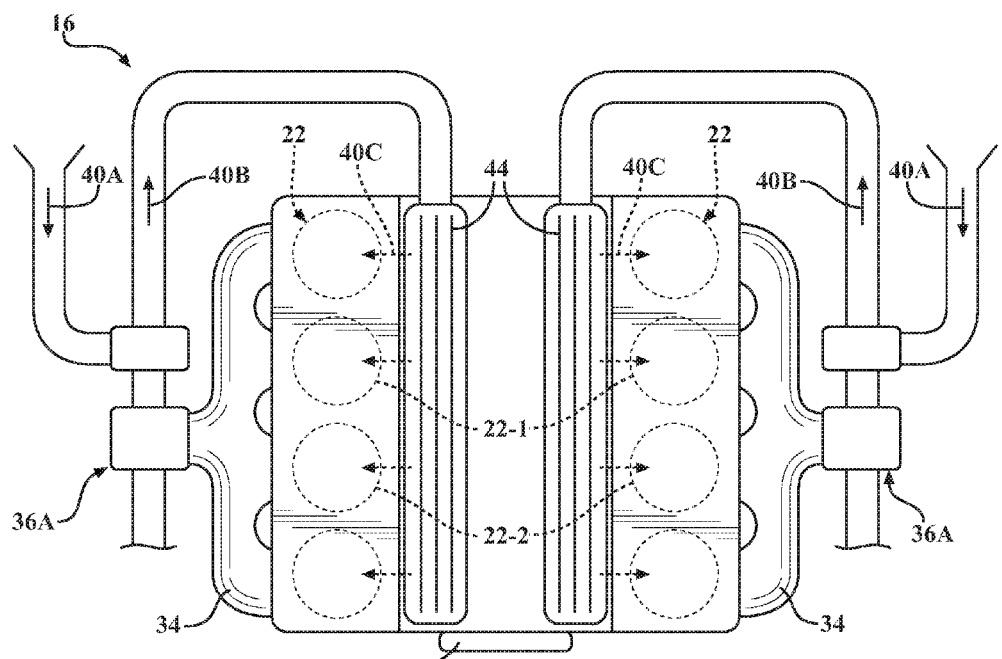
FIG. 2 is a schematic top view of the engine shown in FIG. 1 having two banks of cylinders in a "V" arrangement and fed by a pressurized airflow from charge-air coolers arranged aft of gas compressors.

As shown, the powertrain 12 includes an internal combustion engine 16 and a transmission assembly 18 operatively connected thereto. The powertrain 12 may also include one or more electric motor/generators, none of which are shown, but the existence of which may be envisioned by those skilled in the art. As shown in FIG. 2, the engine 16 includes a cylinder block 20 with a plurality of cylinders 22 arranged in a bank thereof.

Figure 3:
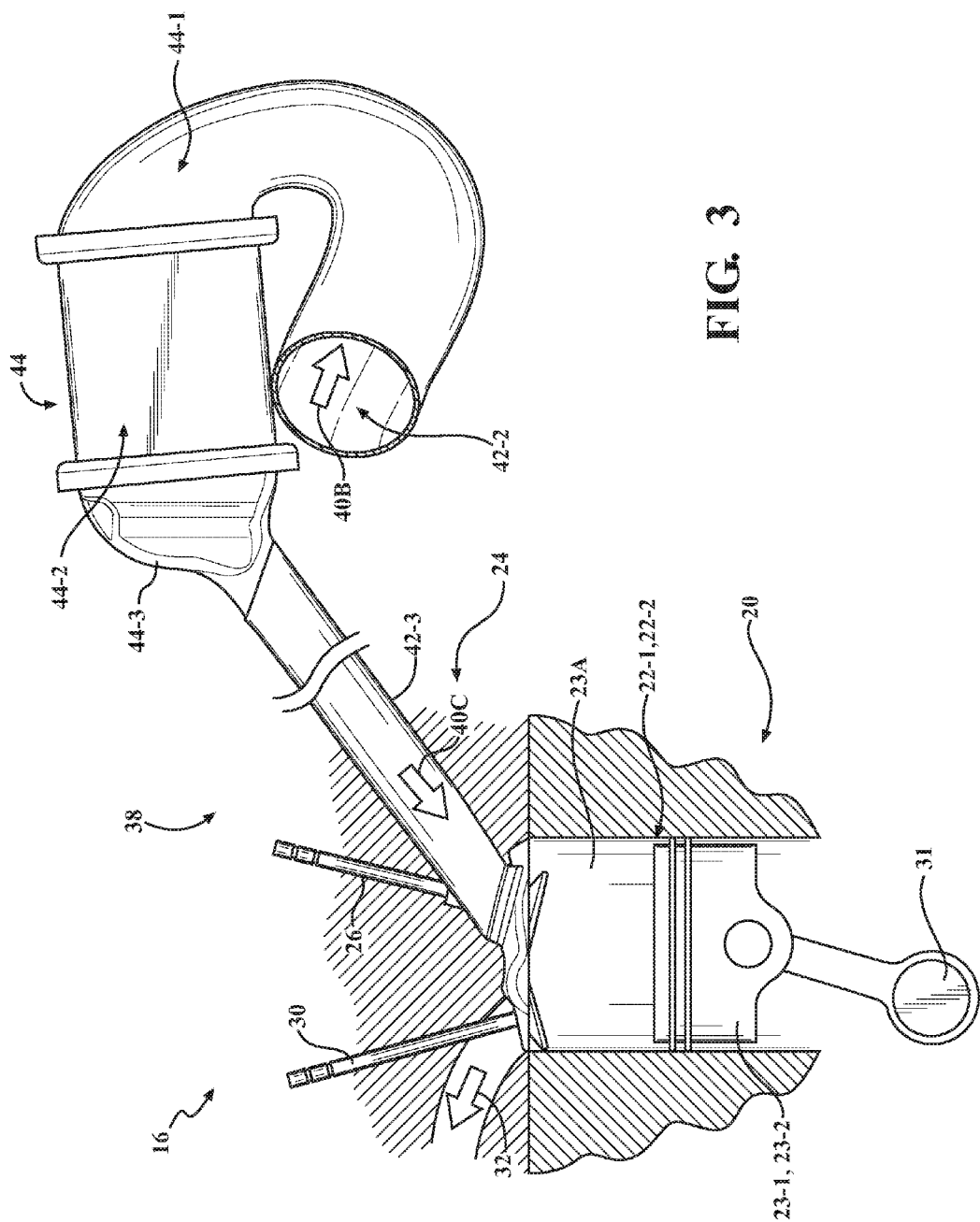
FIG. 3 is a schematic partial cut-away perspective illustration of a cylinder in a bank of a representative engine with a charge-air cooler according to the disclosure.

The cylinder block 20 defines a block deck 20A. As shown in FIG. 2, in a specific embodiment of the engine 16 the cylinder block 20 can define a first bank 20-1 and a second bank 20-2 of cylinders. Each of the banks of cylinders, whether the engine has one such bank (as shown in FIG. 3) or a greater number thereof, includes a first cylinder 22-1 and a physically adjacent second cylinder 22-2 that are operatively connected or linked via the engine's firing order. Specific firing order provisions for the engine 16 and the implications of such will be described in detail below. A cylinder head 24 can be operatively connected to the cylinder block 20 by being mounted to the cylinder block 20 at the block deck 20A. As additionally shown in FIGS. 3-4, the cylinder head 24 may be integrated into or cast together with the cylinder block 20.

The cylinder head 24 receives air and fuel to be used inside the cylinders 22 for subsequent combustion. As can be seen in FIGS. 2 and 3, each cylinder 22 includes a respective piston 23 configured to reciprocate therein. Additionally, combustion chambers 23A are formed within the cylinders 22 between the bottom surface of the cylinder head 24 and the tops of the pistons 23. As known by those skilled in the art, each of the combustion chambers 23A receives fuel and air that are combined to form a fuel-air mixture for subsequent combustion inside the subject combustion chamber. The engine 16 may include a throttle 25 (shown in FIG. 1), which can be configured as a traditional movable throttle blade or another type of an arrangement that meters a volume of air entering the engine from the ambient. Although a V-type eight cylinder engine is shown in FIG. 2 and an in-line four-cylinder engine is shown in FIG. 3, nothing precludes the present disclosure from being applied to an engine having a different number and/or arrangement of cylinders 22.

As shown in FIGS. 2 and 3, the engine 16 also includes a plurality of intake valves 26 operatively connected to the cylinder head 24 and configured to control a supply of air to each cylinder 22 for combustion with fuel therein. The cylinder head 24 generally includes inlet ports 24A for communicating the supply of air or air and fuel to the plurality of intake valves 26. The engine 16 may be configured as a spark-ignition internal combustion engine that employs a spark plug (not shown) to initiate combustion of the fuel and air mixture inside the combustion chambers 23A. The engine 16 additionally includes a plurality of exhaust valves 30 operatively connected to the cylinder head 24 and configured to control removal of post-combustion gasses from each cylinder 22.

Figure 7:
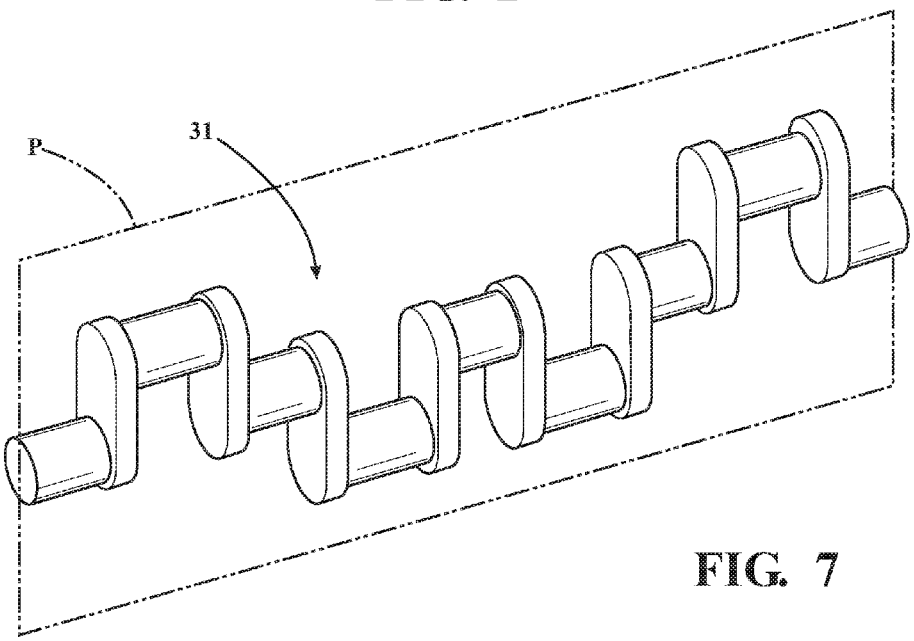
FIG. 7 is a schematic perspective view of a "flat-plane" crankshaft, according to the disclosure.

The engine 16 also includes a crankshaft 31 configured to rotate within the cylinder block 20. As known to those skilled in the art, the crankshaft is consecutively rotated by each of the pistons 23 as a result of an appropriately proportioned fuel-air mixture being selectively admitted into the combustion chambers 23A via one or more intake valves 26 operatively connected to the cylinder head 24, and then burned in the combustion chambers. In a continuous cycle, the rotation of the crankshaft 31 also reciprocates the pistons 23 via respective rods (not shown) as a result of combustion within the cylinders 22, including a first piston 23-1 in the first cylinder 22-1 and a second piston 23-2 in the second cylinder 22-2. For example, the crankshaft 31 may have its rod journals otherwise known as crankpins arranged in a single plane P, as shown in FIG. 7, a configuration that is known in the industry as a "flat-plane" crankshaft.

After the air-fuel mixture is burned inside a specific combustion chamber 23A, the reciprocating motion of a particular piston serves to exhaust post-combustion gasses 32 from the respective cylinder 22 via one or more exhaust valves 30. As known by those skilled in the art, a two-stroke internal combustion engine undergoes a complete combustion cycle, intake-compression-combustion-exhaust, every two full revolutions of the crankshaft, while a four-stroke internal combustion engine undergoes a complete combustion cycle every four revolutions. The cylinder head 24 is also configured to exhaust post-combustion gasses 32 from the combustion chambers 23A, such as via an exhaust manifold 34 (shown in FIG. 1). The exhaust manifold 34 may be internally cast, i.e., integrated, into the cylinder head 24, or be configured as a separate, attachable component for scavenging the exhaust post-combustion gasses 32 from the cylinders 22.

Specifically, the firing order of the envisioned engine 16 can be defined such that the physically adjacent first and second cylinders 22-1 and 22-2 fire relative to each other at 180×N degree intervals of crankshaft rotation, wherein N is an odd integer. In other words, in terms of crankshaft rotation, the physically adjacent first and second cylinders 22-1 and 22-2 have a relative phasing of 180 degrees. Accordingly, such relative phasing of physically adjacent first and second cylinders 22-1 and 22-2 in their respective combustion cycles will also define the phasing of the piston 23-1 of the first cylinder at one half of crankshaft rotation relative to the second piston 23-2 of the second cylinder.

According to the present disclosure, the physically adjacent first and second cylinders 22-1, 22-2 may be any pair of cylinders so disposed in an in-line engine or arranged on the same bank 20-1 or 20-2 of a V-type engine and having the relative phasing defined by the firing order described above. Accordingly, the representative physically adjacent first and second cylinders 22-1 and 22-2 are operatively connected to or associated with one another by the above firing order in the engine 16. Such a firing order can be employed in in-line, as well as V-type engines. The previously described flat-plane configuration of the crankshaft 31 facilitates the physically adjacent first and second cylinders 22-1, 22-2 firing relative to each other at the subject 180×N degree intervals of crankshaft rotation, whether the engine 16 is configured as an in-line or a V-type engine. For example, a V-type eight-cylinder configuration of engine 16 employing the subject firing order at the 180×N degree intervals of crankshaft rotation for the physically adjacent first and second cylinders 22-1, 22-2 can have such a flat-plane crankshaft 31 (shown in FIG. 7). The specific firing order of such a V-eight engine may be 1-8-6-7-5-4-3-2.

As shown in FIG. 1, the engine 10 also includes a boosting system 36 that is configured as a forced induction arrangement having at least one gas compressor 36A. A representative gas compressor 36A may be either a supercharger (not shown) mechanically driven by the crankshaft via a belt or electrically via a motor, or a turbocharger (as shown in FIG. 1) driven by the post-combustion gasses 32 emitted by the cylinders 22 via the exhaust valves 30. Additionally, the boosting system 36 may be configured as a multi-stage arrangement having multiple gas compressors.

Such a multi-stage boosting system may, for example, include two gas compressors, wherein one compressor is configured as either a supercharger or a first turbocharger, and another gas compressor is configured as second turbocharger. The boosting system 36 employing such gas compressors 36A is configured to pressurize a flow of air or an airflow 40A received from the ambient for subsequent delivery to the cylinders 22, including the physically adjacent first and second cylinders 22-1, 22-2.

The engine 16 additionally includes an induction system or inlet assembly 38 that is configured to supply the airflow 40A from the ambient to the boosting system 36. As shown in FIGS. 2 and 3, the inlet assembly 38 includes a charge-air cooler 44. The charge-air cooler 44 can be incorporated into an intake manifold (not shown) mounted directly to the cylinder head 24. The charge-air cooler 44 is configured to cool a pressurized airflow 40B, i.e., after the airflow 40A was pressurized by the boosting system 36, prior to delivery of the pressurized airflow 40B to the cylinders 22, including the physically adjacent first and second cylinders 22-1 and 22-2. The charge-air cooler 44 may be configured as an air-to-liquid intercooler, where thermal energy is removed from the pressurized airflow via a dedicated coolant. The charge-air cooler 44 includes a hot-side plenum 44-1 configured to receive the pressurized airflow aft of the compressor 36A, a heat-exchanger section 44-2 configured to cool the pressurized airflow 40B received at the hot-side plenum, and a cold-side plenum 44-3 configured to discharge a cooled pressurized airflow 40C aft of the heat exchanger section.

During operation of the engine 16 and as the boosting system 36 generates positive pressure, the cold-side plenum 44-3 discharges the cooled pressurized airflow 40C aft of the heat exchanger section 44-2 to the cylinders 22 in the first cylinder bank 20-1 and in the second cylinder bank 20-2, including the physically adjacent first and second cylinders 22-1 and 22-2. The intake valves 26 are configured to control delivery of the cooled pressurized airflow 40C through the cold-side plenum 44-3. Respective intake valves 26 for the first cylinder 22-1 and the second cylinder 22-2 facilitate a first airstream 40C-1 to the first cylinder 22-1 and a second airstream 40C-2 to the second cylinder 22-2 for combustion therein.

In the event the firing order of the engine 16 is such that a firing interval of the respective adjacent cylinders 22-1 and 22-2, i.e., adjacent cylinder firing interval, is at the 180×N degree intervals of crankshaft rotation (and N is an odd integer), the respective airflow waves or pulses of the first and second airstreams 40C-1 and 40C-2 are phased 180 degrees apart. According to the present disclosure, a distinction is made between the engine's "firing order", which describes a sequence within a particular engine cycle, and is specifically the order in which respective cylinders will fire, one after another. On the other hand, the "firing interval" is herein used to denote the temporal firing spacing defined in crankshaft angle degrees from one cylinder in the firing order sequence to the next firing cylinder. For most engines, subsequently firing cylinders are not necessarily physically adjacent, but the firing interval is typically uniform. Accordingly, "adjacent cylinder firing interval" is defined as the firing spacing between physically adjacent cylinders, herein cylinders 22-1 and 22-2.

As a result of the above noted firing order of the engine 16, an occurrence of the first pressurized airstream 40C-1 may temporally overlap an occurrence of the second pressurized airstream 40C-2, i.e., such that the first airstream physically occurs alongside the second pressurized airstream. Furthermore, when the first and second pressurized airstreams 40C-1, 40C-2 are thus generated 180 degrees apart, the pulses of the respective airstream waves will tend to interfere with one another and may cancel each other out entirely. By not permitting cancellation between the first and second pressurized airstreams 40C-1, 40C-2, the energy of the respective airstreams is used within the heat exchanger section 44-2 to promote cooling of the pressurized airflow 40B.

Figure 4:
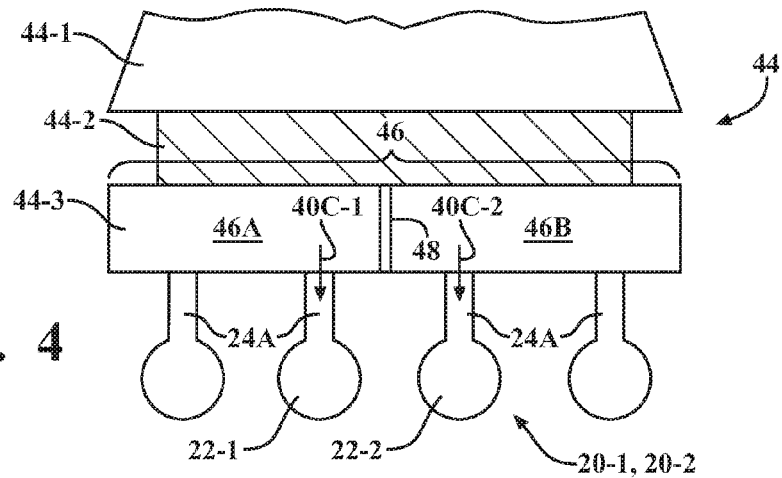
FIG. 4 is a schematic internal plan view of the charge-air cooler shown in FIGS. 1-3, having a cold-side plenum with a partition arranged to separate airstreams for adjacent cylinders according to one embodiment of the disclosure.
Figure 5:
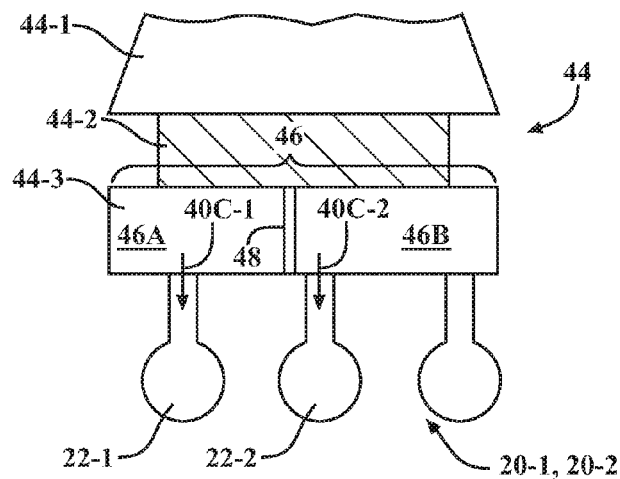
FIG. 5 is a schematic internal plan view of the charge-air cooler shown in FIGS. 1-3, having a cold-side plenum with a partition arranged to separate airstreams for adjacent cylinders according to another embodiment of the disclosure.
Figure 6:
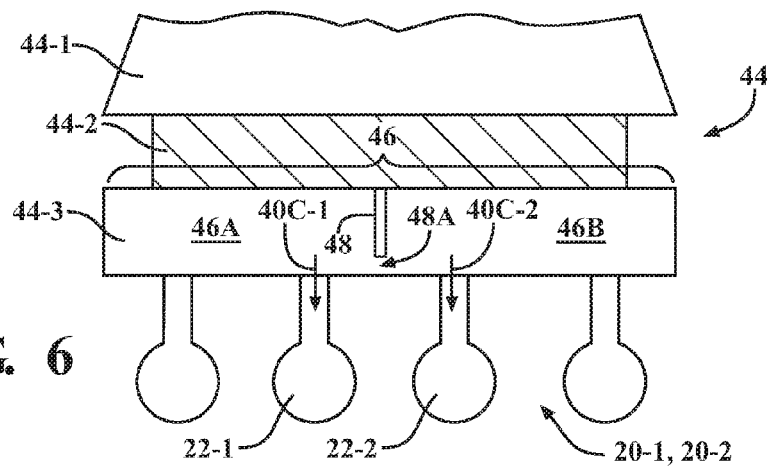
FIG. 6 is a schematic internal plan view of the charge-air cooler shown in FIG. 4, having a cold-side plenum with a communication channel in the partition according to the disclosure.

As can be seen from FIGS. 4 and 5, the cold-side plenum 44-3 defines a plenum volume 46. The charge-air cooler 44 also includes a partition 48 arranged inside the volume 46 defined by the cold-side plenum 44-3. The partition 48 can be cast-in and/or machined into the cold-side plenum 44-3. The partition 48 is configured to physically separate the first airstream 40C-1 from the second airstream 40C-2 and thereby minimize interference therebetween, especially when the pulses of the respective airstreams occur 180 degrees apart. The partition 48 may be configured to fully separate the first airstream 40C-1 from the second airstream 40C-2 (shown in FIGS. 4 and 5) and thereby prevent communication and the resultant interference therebetween. In a separate embodiment, the partition 48 may be configured to partially separate the first airstream 40C-1 from the second airstream 40C-2 via maintaining a gap or communication channel 48A between the respective airflows (shown in FIG. 6). Consequently, the communication channel 48A can facilitate a degree of communication or cross-talk between the first and second pressurized airstreams 40C-1, 40C-2.

The partition 48 is arranged in the charge-air cooler 44 to divide the plenum volume 46 of the cold-side plenum 44-3 into separate sub-volumes 46A and 46B. Thus generated sub-volumes 46A and 46B can be completely separate, or they can be substantially separate, but for the communication channel 48A. The two sub-volumes 46A and 46B generated in the cold-side plenum 44-3 by the partition 48 can be different or substantially equal. In the event the total count of cylinders 22 defined by a particular bank in the engine 16, such as either bank 20-1 or 20-2 in a V-type engine, is an even number, the partition 48 can divide the cold-side plenum 44-3 into two substantially equal volumes 46A, 46B. In other words, when the number of cylinders 22 on a single bank of the engine 16 is an even count, the partition 48 can be positioned in the cold-side plenum 44-3 between the two airstreams for the centrally positioned cylinders, as shown in FIGS. 2 and 4.

On the other hand, when the total count of cylinders 22 defined by a particular bank in the engine 16 is an odd number, such as in an in-line three-cylinder or a V-type six-cylinder engine, the volumes 46A, 46B generated by the partition 48 can be unequal. In other words, in the case of an odd count of cylinders on one bank of the engine 16, the partition 48 can be shifted in the cold-side plenum 44-3 to one side of the airstream for the centrally positioned cylinder (as shown in FIG. 5). Such positioning of the partition 48 in the charge-air cooler 44 of the engine 16 having a bank with an odd count of cylinders 22 is intended to generate as close to an evenly divided cold-side plenum 44-3 as can be accomplished with such an engine configuration.

Overall, the disclosed partition 48 in the cold-side plenum 44-3 of the charge-air cooler 44 is intended to minimize pressure wave interference and cancellation between 180 degrees out-of-phase airstreams 40C-1, 40C-2 of the first and second physically adjacent cylinders 22-1 and 22-2. At the same time, the actual positioning of the partition 48 in the cold-side plenum 44-3 is intended to maintain sufficient air volumes in the separated sections of the cold-side plenum to feed each individual cylinder 22 for effective performance of the engine 16. Furthermore, the disclosed partition 48 in the cold-side plenum 44-3 is configured to increase unsteady velocity of the respective first and second airstreams 40C-1 and 40C-2 through the charge-air cooler 44. By minimizing pressure wave interference and cancellation between 180 degrees out-of-phase airstreams 40C-1, 40C-2 of the first and second physically adjacent cylinders 22-1, 22-2, energy of the respective airstreams is used to promote enhanced cooling of the pressurized airflow 40B in the heat exchanger section 44-2 and thereby increase efficiency of the engine 16.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder block defining a bank of cylinders having a first cylinder and a physically adjacent second cylinder;
   a cylinder head operatively connected to the cylinder block by being one of mounted to and integrally formed therewith and in fluid communication with the first cylinder and the second cylinder;
   a gas compressor configured to pressurize an ambient airflow for delivery to the first cylinder and the second cylinder;
   a plurality of intake valves operatively connected to the cylinder head and configured to control delivery of the pressurized airflow as a first airstream to the first cylinder and a second airstream to the second cylinder for combustion therein, wherein a firing interval for the adjacent first and second cylinders results in an occurrence of the first airstream temporally overlapping an occurrence of the second airstream; and
   a charge-air cooler arranged between the plurality of intake valves and the gas compressor and configured to cool the pressurized airflow prior to delivery thereof to the first cylinder and the second cylinder;
   wherein the charge-air cooler includes:
      a cold-side plenum configured to discharge the pressurized airflow toward the first cylinder and the second cylinder; and
      a partition arranged in the cold-side plenum and configured to fully separate the first airstream from the second airstream and thereby prevent interference therebetween.

2. The internal combustion engine of claim 1, further comprising a crankshaft configured to rotate relative to the cylinder block as a result of the combustion within the first and second cylinders, wherein the firing interval for the adjacent first and second cylinders is at a 180×N degree interval of crankshaft rotation, and wherein N is an odd integer, resulting in the first and second airstreams cancelling each other out.

3. The internal combustion engine of claim 1, wherein the cold-side plenum defines a plenum volume, and wherein the partition divides the cold-side plenum volume into individual sub-volumes.

4. The internal combustion engine of claim 3, wherein a total count of cylinders defined by the bank of cylinders is an even number, and wherein the two sub-volumes are equal.

5. The internal combustion engine of claim 3, wherein a total count of cylinders defined by the bank of cylinders is an odd number, and wherein the two sub-volumes are not equal.

6. The internal combustion engine of claim 1, wherein the partition is configured to increase velocity of the first and second airstreams through the charge-air cooler such that energy of the respective first and second airstreams is used to enhance cooling of the pressurized airflow by the charge-air cooler.

7. The internal combustion engine of claim 1, wherein the partition is at least one of cast-in and machined into the cold-side plenum.

8. The internal combustion engine of claim 1, wherein the charge-air cooler is configured as an air-to-liquid intercooler.

9. A charge-air cooler for a boosted internal combustion engine, the engine including:
   a cylinder block defining a bank of cylinders having a first cylinder and a physically adjacent second cylinder;
   a cylinder head operatively connected to the cylinder block by being one of mounted to and integrally formed therewith and in fluid communication with the first cylinder and the second cylinder;
   a gas compressor configured to pressurize an ambient airflow for delivery to the first cylinder and the second cylinder; and
   a plurality of intake valves operatively connected to the cylinder head and configured to control delivery of the pressurized airflow as a first airstream to the first cylinder and a second airstream to the second cylinder for combustion therein, wherein a firing interval for the adjacent first and second cylinders results in an occurrence of the first airstream temporally overlapping an occurrence of the second airstream;
   the charge-air cooler arranged between the plurality of intake valves and the gas compressor and configured to cool the pressurized airflow prior to delivery thereof to the first cylinder and the second cylinder, the charge-air cooler comprising:
      a cold-side plenum configured to discharge the pressurized airflow toward the first cylinder and the second cylinder; and
      a partition arranged in the cold-side plenum and configured to fully separate the first airstream from the second airstream and thereby prevent interference therebetween.

10. The charge-air cooler of claim 9, wherein the engine additionally includes a crankshaft configured to rotate relative to the cylinder block as a result of the combustion within the first and second cylinders, wherein the firing interval for the adjacent first and second cylinders is at a 180×N degree interval of crankshaft rotation, and wherein N is an odd integer, resulting in the first and second airstreams cancelling each other out.

11. The charge-air cooler of claim 9, wherein the partition divides the cold-side plenum volume into two sub-volumes.

12. The charge-air cooler of claim 11, wherein a total count of cylinders defined by the bank of cylinders is an even number, and wherein the two sub-volumes are equal.

13. The charge-air cooler of claim 11, wherein a total count of cylinders defined by the bank of cylinders is an odd number, and wherein the two sub-volumes are not equal.

14. The charge-air cooler of claim 9, wherein the partition is configured to increase velocity of the first and second airstreams through the charge-air cooler such that energy of the respective first and second airstreams is used to enhance cooling of the pressurized airflow by the charge-air cooler.

15. The charge-air cooler of claim 9, wherein the partition is at least one of cast-in and machined into the cold-side plenum.

16. The charge-air cooler of claim 9, wherein the charge-air cooler is configured as an air-to-liquid intercooler.

* * * * *